| United States Patent [19] | [11] Patent Number: 4,568,483 |
| Naarmann et al. | [45] Date of Patent: * Feb. 4, 1986 |

[54] ELECTRICALLY CONDUCTIVE PYRROLE COPOLYMERS AND THEIR PREPARATION

[75] Inventors: Herbert Naarmann, Wattenheim; Petr Simak; Gernot Köhler, both of Ludwigshafen, all of Fed. Rep. of Germany

[73] Assignee: BASF Aktiengesellschaft, Fed. Rep. of Germany

[*] Notice: The portion of the term of this patent subsequent to Aug. 28, 2001 has been disclaimed.

[21] Appl. No.: 504,724

[22] Filed: Jun. 16, 1983

[30] Foreign Application Priority Data

Jun. 24, 1982 [DE] Fed. Rep. of Germany ....... 3223544

[51] Int. Cl.$^4$ .......................... H01B 1/12; C08F 26/06
[52] U.S. Cl. ................................... 252/500; 252/518; 526/258
[58] Field of Search .......................... 252/500; 526/258

[56] References Cited

U.S. PATENT DOCUMENTS 3,574,072  4/1971  Louvar ................................. 204/72
4,468,291  8/1984  Naarmann et al. .................... 204/13

OTHER PUBLICATIONS

A. G. McDiarmid and A. J. Heeger, "Organic Metals and Semiconductors: The Chemistry of Polyacetylene, $(CH)_x$, and its Derivatives", *Synthetic Metals*, Band 1, 1979/80, pp. 101–118.

A. F. Diaz et al, "Electrochemical Polymerization of Pyrrole", *J. Chem. Soc.*, Chem. Comm., 1979, pp. 635–636.

A. F. Diaz et al, "'Organic Metals': Polypyrrole, a Stable Synthetic 'Metallic' Polymer", *J. Chem. Soc.*, Chem. Comm., 1979, pp. 854–855.

American Chemical Society, "Electrosynthesis and Study of Conducting Polymeric Films", *Organic Coatings and Plastics Chemistry*, vol. 43, 1980, pp. 774–776.

D. E. Weiss et al., "Electronic Conduction in Polymers, I, The Chemical Structure of Polypyrrole", *Austr. J. Chem.*, vol. 16, pp. 1056–1075, (1963).

D. E. Weiss et al., "Electronic Conduction in Polymers, II, The Electrochemical Reduction of Polypyrrole at Controlled Potential", *Austr. J. Chem.*, vol. 16, pp. 1076–1089, (1963).

D. E. Weiss et al., "Electronic Conduction in Polymers, III, Electronic Properties of Polypyrrole", *Austr. J. Chem.*, vol. 16, pp. 1096–1103, (1963).

*Primary Examiner*—Paul Lieberman
*Assistant Examiner*—Robert A. Wax
*Attorney, Agent, or Firm*—Keil & Weinkauf

[57] ABSTRACT

Highly electrically conductive copolymers of pyrroles and other heterocyclic compounds having a conjugated $\pi$-electron system, which possess good mechanical properties coupled with a well-balanced spectrum of properties, are prepared by anodic polymerization of the pyrroles and other heterocyclic compounds and/or their dimers or oligomers in a polar solvent in the presence of a suitable conductive salt.

6 Claims, No Drawings

ELECTRICALLY CONDUCTIVE PYRROLE COPOLYMERS AND THEIR PREPARATION

The present invention relates to electrically conductive copolymers of pyrroles and other heteroaromatic compounds, and their preparation by anodic copolymerization of these monomers in the presence of a conductive salt. The novel copolymers thus obtained are materials, in general films, which possess high electrical conductivity, good mechanical properties, and advantageous performance characteristics.

U.S. Pat. No. 3,574,072 describes the electrochemical polymerization of 5-membered and 6-membered heterocyclic compounds, including pyrrole, but no details are given concerning the electrical conductivity and the processability of the resulting materials. The stated patent also gives no information about the copolymerization of the heterocyclic compounds or the properties of the copolymers obtained from these.

A. F. Diaz et al., J. Chem. Soc. Chem. Comm. 1979, page 635, J. Chem. Soc. Chem. Comm. 1979, page 854, and ACS Org. Coat. Plast. Chem. 43 (1980), have disclosed that anodic polymerization of pyrrole in the presence of a conductive salt gives films having electrical conductivities of not more than $10^2$ $\Omega^{-1}$ cm$^{-1}$. These are p-conductive polypyrroles, and the counterions are, in particular, $BF_4^-$, $AsF_6^-$, $ClO_4^-$ and $HSO_4^-$. However, the mechanical properties of the films thus obtained are still far from satisfactory.

According to patent application Ser. No. 332,839, filed Dec. 21, 1981 of the same assignee, now U.S. Pat. No. 4,401,545 anodic polymerization of pyrroles in the presence of, as conductive salts, salts of acidic nitroaromatics gives electrically conductive polypyrrole complexes which contain nitroaromatic anions and possess substantially better mechanical properties than the conventional electrically conductive polypyrroles. However, these polypyrrole complexes which possess nitroaromatic anions are still unsatisfactory for special purposes.

It is an object of the present invention to provide further novel polypyrroles which possess high electrical conductivity coupled with good mechanical properties, and have a spectrum of properties which is superior to that of the conventional electrically conductive polypyrrole systems. It is a further object of the invention to provide a simple and advantageous process for the preparation of such polymers.

We have found, surprisingly, that this object is achieved if pyrroles and other heterocyclic compounds having a conjugated $\pi$-electron system are converted to copolymers by anodic oxidation in the presence of a conductive salt, and that particularly advantageous products are obtained if dimers or oligomers, or even cyclic oligomers, of the 5-membered or 6-membered heteroaromatic compounds are used.

The present invention accordingly relates to electrically conductive pyrrole copolymers which in addition to pyrrole units contain units of other heterocyclic comonomers having a conjugated $\pi$-electron system.

The present invention furthermore relates to a process for the preparation of these copolymers, wherein pyrroles and other heterocyclic compounds having a conjugated $\pi$-electron system, or their dimers or oligomers, are copolymerized by anodic oxidation in a polar solvent and in the presence of a conductive salt. The present invention furthermore relates to special embodiments of the copolymers and of the process for their preparation in accordance with the detailed description below.

The novel copolymers prepared by anodic polymerization are highly electrically conductive systems, some or all of which contain the anion of the conductive salt used in their preparation. The copolymers according to the invention may therefore also be regarded as complexes of cations of copolymers of the pyrroles and other heterocyclic compounds with counter-anions. Moreover, they possess good mechanical properties and a well-balanced and improved spectrum of properties, in particular very good performance characteristics; this makes them suitable for a very wide range of uses.

For the purposes of the present invention, pyrroles are unsubstituted pyrrole itself, substituted pyrroles, such as N-alkylpyrroles, N-arylpyrroles, pyrroles which are monoalkyl-substituted or dialkyl-substituted at the carbon atoms and pyrroles which are monohalogenated or dihalogenated at the carbon atoms. In the preparation of the novel copolymers, the pyrroles can be used alone or mixed with one another, so that the copolymers may contain one or more different pyrroles. Preferably, the repeating pyrrole units in the copolymer are essentially based on unsubstituted pyrrole itself. Where substituted pyrroles are employed in the preparation, preferred compounds are the 3,4-dialkylpyrroles, in particular those where alkyl is of 1 to 4 carbon atoms, eg. 3,4-dimethylpyrrole and 3,4-diethylpyrrole, as well as the 3,4-dihalopyrroles, in particular 3,4-dichloropyrrole.

The other heterocyclic compounds which have a conjugated $\pi$-electron system and, in accordance with the invention, are to be used as comonomers or are present in the copolymers are heteroaromatic compounds; for the purposes of the present invention, and for the sake of simplicity, these compounds are also referred to simply as heterocyclic compounds or the other heterocyclic compounds. Preferably, they are 5-membered or 6-membered ring systems which possess one or more, preferably one to three, in particular one or two, heteroatoms and can be unsubstituted or substituted at the heteroatom or at the ring carbon atoms, for example by alkyl. Preferably, the heterocyclic compounds as well as the pyrroles should contain two or more ring carbon atoms which are unsubstituted, so that the anodic oxidation can be readily carried out and proceeds smoothly. Examples of suitable heterocyclic compounds are furan, thiophene, thiazole, oxazole, thiadiazole, imidazole, pyridine, 3,5-dimethylpyridine, pyrimidine, pyrazine and 3,5-dimethylpyrazine. The 5-membered heterocyclic compounds, eg. furan, thiophene, thiazole and thiadiazole have proved particularly useful. The heterocyclic compounds can be used alone or as a mixture with one another.

It is particularly advantageous if dimers or oligomers of the pyrroles and/or the other heterocyclic compounds are used as starting materials, or are at least present, in the preparation of the novel copolymers. The oligomers may furthermore be cyclic oligomerization products. Dimeric or oligomeric heterocyclic compounds, in particular dimers or oligomers of thiophene, furan, pyridine or pyrimidine, are preferably employed. Examples of these are cyclic tetrathienyls, hexathienyls, cyclooctatetrafurans, cyclooctatetrathionaphthenes, cyclooctatetrapyrimidines and bipyrimidines, as may be prepared in accordance with Chem. Ber. 111 (1978) 1330–1336, and dimers and oligomers of the bifuran, terfuran, quaterfuran or octifuran type, as may be obtained in accordance with Chem. Ber. 114 (1981), 3667–3673. Other compounds which may be used are trimers or other oligomers of pyrrole or N-alkylpyrroles, which are obtainable as described in J. Chem. Soc. (1957), 4018–4022 and Chem. Ber. 114 (1981), 3674–3683. To prepare the novel copolymers, the dimeric or oligomeric heterocyclic compounds may be used alone or together with monomeric heterocyclic compounds.

Compared with the copolymers obtained using only monomeric pyrroles and other monomeric heterocyclic compounds, the novel copolymers prepared with the concomitant use of dimeric or oligomeric heterocyclic compounds are crystalline products which, inter alia, have a further improved tensile strength and stability to electrolytes and give uniform, homogeneous films with a smooth surface.

The novel copolymers contain, in addition to pyrrole units, repeating units of one or more of the other heterocyclic compounds. In the copolymers, the weight ratio of the pyrrole units to the units of the other heterocyclic compounds can vary within wide limits, for example from 1:99 to 99:1, preferably from 20:80 to 90:10.

To prepare the copolymers, the monomers, ie. the pyrroles and the other heterocyclic compounds or their dimers or oligomers, are anodically oxidized and hence polymerized in a polar solvent in the presence of a suitable conductive salt. The total monomer concentration is in general about 0.1 mole per liter of solvent. However, it can deviate substantially from this value since the electrolysis is generally carried out only to small conversions. In addition to, or instead of, the other heterocyclic compounds, nitrogen-containing acrylic acid derivatives, eg. acrylonitrile or acrylamides, in particular diacetoneacrylamide, can also be used as monomers for the preparation of pyrrole copolymers. We have in fact found that these acrylic acid derivatives can be reacted with the pyrroles under the conditions of anodic oxidation to give copolymers.

Preferably used conductive salts are ionic or ionizable compounds possessing anions of strong, oxidizing acids or aromatics which have acidic groups and are unsubstituted or substituted by nitro groups. Suitable cations for these conductive salts are alkaline earth metal cations, H+ and in particular alkali metal cations, preferably $Li^+$, $Na^+$ or $K^+$. Other very advantageous cations are $NO^+$, $NO_2^+$ and in particular the onium cations, especially those of nitrogen and of phosphorus, for example those of the $R_4N^+$ or $R_4P^+$ type, wherein the radicals R independently of one another are each hydrogen, lower alkyl, preferably of 1 to 6 carbon atoms, a cycloaliphatic radical, preferably of 6 to 14 carbon atoms, or an aromatic radical, preferably of 6 to 14 carbon atoms. Particularly preferred ammonium and phosphonium cations are the tertiary and quaternary cations in which alkyl is of 1 to 4 carbon atoms. Examples of preferred onium cations are, in addition to the $NH_4^+$ ion, in particular the tetramethylammonium, the tetraethylammonium, the tetra-n-butylammonium, the triphenylphosphonium and the tri-n-butylphosphonium cation.

$BF_4^-$, $AsF_4^-$, $AsF_6^-$, $SbF_6^-$, $SbCl_6^-$, $PF_6^-$, $ClO_4^-$, $HSO_4^-$ and $SO_4^-$ have proved to be advantageous as anions for the conductive salt. Another group of anions which can be particularly advantageously employed in the preparation of the novel copolymers is derived from aromatics possessing acidic groups. These include the $C_6H_5COO^-$ anion and in particular the anions of unsubstituted or alkyl-substituted aromatic sulfonic acids. In another very advantageous embodiment, the nuclei of the acidic aromatics can carry, in addition to the acidic groups, other substituents, in particular nitro groups. Examples of these acidic nitroaromatics are nitrophenols, nitro-substituted aromatic carboxylic acids and nitrosubstituted aromatic sulfonic acids. In particular, the salts of nitrophenols, dinitrophenols, trinitrophenols, nitrobenzoic acids, dinitrobenzoic acids, trinitrobenzoic acids, nitrobenzenesulfonic acids, dinitrobenzenesulfonic acids and trinitrobenzenesulfonic acids are used, and the salts of nitroaromatics possessing several acidic groups, eg. phenolic hydroxyl groups, carboxyl groups or sulfonic acid groups, are also suitable. Other suitable compounds are acidic aromatics possessing nitroso groups. Conductive salts containing the benzenesulfonate anion ($C_6H_5SO_3^-$) give good results and are hence very particularly preferred.

In the novel process, the conductive salt concentration is in general from 0.001 to 1, preferably from 0.01 to 0.1 mole/liter of electrolyte solvent.

The process according to the invention is carried out in a polar, preferably organic, in particular aprotic, solvent which is capable of dissolving the monomers and the conductive salt. If a water-miscible organic solvent is used, the electrical conductivity may be increased by adding a small amount of water, in general not more than 3% by weight, based on the organic solvent, and this may be done even if in these cases the procedure is carried out as a rule in an anhydrous system and in particular in the absence of compounds which render the medium alkaline. Examples of preferred organic electrolyte solvents are alcohols, ethers, such as 1,2-dimethoxyethane, dioxane, tetrahydrofuran and methyltetrahydrofuran, acetone, acetonitrile, dimethylformamide, dimethylsulfoxide, methylene chloride, N-methylpyrrolidone and propylene carbonate.

The preparation of the novel copolymers of the pyrroles and the other heterocyclic compounds is preferably carried out in a simple conventional electrolysis cell or electrolysis apparatus wich consists of a cell without a diaphragm, possesses two electrodes and is connected to an external current source. The electrodes can be of, for example, graphite, but in general nickel, titanium or noble metal electrodes, preferably platinum electrodes, are used. It is advantageous if the anode has a sheet-like structure, and particularly advantageous if both electrodes have such a structure. In a particular embodiment of the novel process, the anode may furthermore be composed of an electrically conductive polymer, for example polypyrrole prepared by anodic oxidation, doped p-conductive polyacetylene or doped p-conductive polyphenylene. In this case, the pyrroles and the other heterocyclic compounds or their dimers or oligomers are in general polymerized onto the electrically conductive polymer, which is generally in the form of a film.

Depending on the manner in which the process is carried out, different types of copolymers can result. If, for example, noble metal electrodes and a mixture of pyrroles and the other heterocyclic compounds (which here and hereinafter also mean, and include, the corresponding dimers and oligomers) are employed, the resulting polymer film contains the monomer units in random distribution. However, the pyrroles and the other heterocyclic compounds can also be polymerized stepwise, ie. in succession. For example, it is possible first to polymerize only the pyrrole, with deposition of an appropriate polypyrrole film on the anode, and thereafter to anodically oxidize the other heterocyclic compounds and thereby polymerize these onto the polypyrrole produced beforehand. An equally suitable method of carrying out this version of the process is to employ a prepared polypyrrole film as the anode and then to polymerize only the other heterocyclic compounds onto this anode. This gives copolymers or copolymer films which have a layered structure and high electrical conductivity. This stepwise copolymerization can of course also be carried out so that the other heterocyclic compounds are polymerized first, followed by the pyrrole, or that more than two stages are employed, in which, for example, first the pyrroles, then the other heterocyclic compounds and finally once again the pyrroles are polymerized, or vice versa.

Even when the stated electrically conductive polymers are employed as the anode material, the pyrroles and the other heterocyclic compounds can be polymerized either as a mixture or stepwise, ie. in succession. For example, when the anode material used in doped polyacetylene and a mixture of pyrroles and the other heterocyclic compounds is employed, the resulting copolymer film is highly electrically conductive and comprises a layer composed of acetylene units and, linked to this via chemical bonds, a layer composed of units of the pyrroles and of the other heterocyclic compounds. If the copolymerization of the pyrroles and heterocyclic compounds is carried out by a stepwise procedure, the resulting copolymer film comprises a layer composed of acetylene units, a layer composed of pyrrole units and a layer composed of units of the other heterocyclic compounds, the individual layers being linked with one another via chemical bonds. If the anode already consists of electrically conductive polypyrroles or polymers of the other heterocyclic compounds, it is, as mentioned above, sufficient in the preparation of the novel copolymer by the process according to the invention if only the other monomers required, ie. the other heterocyclic compounds or the pyrroles, are employed.

In addition to the above simple electrolysis cell without a diaphragm, it is also possible to use other electrolysis apparatuses for the novel process, for example cells containing a diaphragm or those possessing reference electrodes for the precise determination of the potential. To monitor the thickness of the deposited film, it is advantageous to measure the amount of current (amp.-sec).

The electrolysis is usually carried out at room temperature and under an inert gas. The temperature at which the novel copolymerization is carried out was found not to be critical, so that it can be varied within a substantial range provided that it does not fall below the solidification point, or exceed the boiling point, of the electrolyte solvent. In general, a reaction temperature of from −40° to +40° C. has proved very advantageous.

A suitable current source for operating the electrolysis cell in which the novel process is carried out is any d.c. current cell, eg. a battery which delivers a sufficiently high voltage. Advantageously, the voltage is from about 1 to 25, particularly advantageous from about 2 to 12, volt. The current density is usually from 0.05 to 100, preferably from 0.1 to 20, mA/cm$^2$.

The novel copolymers deposited at the anode during electrolysis are washed with solvents to remove adhering conductive salt, and dried at from 30° to 150° C., preferably under reduced pressure. When graphite, noble metal or similar electrodes are used, the copolymer, which is generally deposited as a film, can be readily detached from the electrode, especially where the thickness of the deposited layer is greater than 50 μm. Where the anode material used is a conductive polymer film, the comonomers employed according to the invention are, as mentioned above, polymerized onto the polymeric electrode material, so that in this case the polymer used as the anode is incorporated into the resulting copolymer.

The novel copolymers have high electrical conductivities, in general from 1 to $10^2$ $\Omega^{-1}$ cm$^{-1}$, and good mechanical properties. To measure the force at break and the tensile strength, films composed of the novel copolymers and having defined dimensions (clamped length 25 mm, measured length 10 mm, width 4 mm) are stretched in accordance with DIN No. 53,504 on an INSTRON 1112 machine until they break. During this process, the films are not significantly elongated. The electrical conductivity (in $\Omega^{-1}$ cm$^{-1}$) is determined by applying conductive silver contacts to the film and carrying out the measurement by the two-point method. Identical results are obtained when the measurement is carried out by the four-point method, where the contact resistances cannot play a role. No contribution to the current flow from ionic conduction was found.

The novel copolymers have very good performance characteristics and can be used for the production of electrodes, catalysts, electrical storage systems, batteries, switches, semiconductor components, shielding materials and solar cells, and for the antistatic treatment of plastics. They constitute an advance in the art especially where good mechanical properties of the components, coupled with low specific gravity and well-balanced properties, are important.

In the examples which follow, and illustrate the invention, parts and percentages are by weight, unless stated otherwise.

EXAMPLE 1

120 ml of acetonitrile, 0.48 g of the pyrrole/furan-mixture specified in Table 1 below and 0.39 g of tributylammonium hexafluoroarsenate (AsF$_6^-$) were initially taken in a glass vessel, two platinum electrodes, each having an area of 14 cm$^2$, were introduced into the solution at a distance of 4 cm apart, and electrolysis was carried out using a current of 140 amp.sec, while stirring. During electrolysis, a black pyrrole/furan copolymer film was deposited on the anode. The coated anode was washed with acetonitrile and dried at 60° C., after which the film could be detached from the platinum. The properties of the resulting copolymer films are likewise summarized in Table 1.

TABLE 1

| | Monomer mixtures | | | |
|---|---|---|---|---|
| Experiment | Parts of pyrrole | Parts of furan | Tensile strength N/mm$^2$ | Conductivity $\Omega^{-1}$ cm$^{-1}$ |
| 1a | 0.4 | 0.08 | 55 | 85 |
| b | 0.38 | 0.1 | 60 | 90 |
| c | 0.30 | 0.18 | 65 | 92 |
| d | 0.24 | 0.24 | 72 | 102 |
| e | 0.20 | 0.28 | 75 | 105 |
| f | 0.10 | 0.38 | 63 | 87 |
| g | 0.01 | 0.47 | 60 | 84 |

COMPARATIVE EXAMPLE

The procedure described in Example 1 was followed, except that the pyrrole/furan monomer mixture was replaced by 0.48 g of pyrrole alone. The resulting film had a tensile strength of 21 N/mm$^2$ and an electrical conductivity of 50 $\Omega^{-1}$ cm$^{-1}$.

EXAMPLE 2

The procedure described in Example 1 was followed, except that in this case 0.5 g of pyrrole, 0.2 g of thiadiazole and, as the conductive salt, 0.6 g of tributylammonium perchlorate were initially taken. The resulting 58 μm thick film had a tensile strength of 65 N/mm$^2$ and an electrical conductivity of 53 $\Omega^{-1}$ cm$^{-1}$.

EXAMPLE 3

120 ml of acetonitrile, 0.48 g of pyrrole and, as the conductive salt, 1.4 g of 2-nitrophenol and 1.85 g of tributylamine were initially taken in a glass vessel, and the mixture was stirred. Electrolysis was carried out as described in Example 1, 0.6 g of thiophene being metered in at the same time. The resulting 60 μm thick copolymer film had a tensile strength of 41 N/mm$^2$ and an electrical conductivity of 42 $\Omega^{-1}$ cm$^{-1}$.

EXAMPLE 4

120 ml of acetonitrile, 0.48 g of pyrrole, 0.2 g of thiadiazole, 0.2 g of 3,5-dimethylpyrazine, 1.5 g of tributylammonium sulfate and 0.93 g of tributylamine were initially taken in a glass vessel, and the mixture was stirred. Electrolysis was carried out as described in Example 1. The resulting 52 μm thick copolymer film had a tensile strength of 50 N/mm$^2$ and an electrical conductivity of 55 $\Omega^{-1}$ cm$^{-1}$.

EXAMPLE 5

The procedure described in Example 1 was followed, except that in this case 120 ml of acetonitrile, 0.5 g of thiophene, 0.56 g of 3,4-dimethylpyrrole and 0.39 g of tributylammonium perchlorate were initially taken under argon. The anode used in this case was a polypyrrole film, and electrolysis was carried out using a current of 80 amp.sec. The resulting 60 μm thick film had a tensile strength of 45 N/mm$^2$ and an electrical conductivity of 66 $\Omega^{-1}$ cm$^{-1}$.

EXAMPLE 6

120 ml of acetonitrile, 0.61 g of 3,4-dimethylpyrrole, 0.6 g of thiazole and 0.45 g of tributylammonium hexafluorophosphate were initially taken, under argon, in a glass vessel, and the mixture was stirred. The anode used was a p-conductive polyacetylene film doped with 10% of PF$_6^-$, and the procedure described in Example 1 was followed. The resulting 58 μm thick film had a tensile strength of 30 N/mm$^2$ and an electrical conductivity of 34 $\Omega^{-1}$ cm$^{-1}$.

EXAMPLE 7

120 ml of acetonitrile, 0.84 ml of water, 0.40 g of pyrrole, 0.08 g of thiophene and 0.8 g of tetramethylammonium tetrafluoroborate were initially taken in a glass vessel, and the mixture was stirred. The anode used in this case was a p-conductive polyacetylene film doped with 15% of BF$_4^-$, and electrolysis was carried out using a current of 100 amp.sec, the procedure otherwise being as described in Example 1. The resulting 55 μm thick copolymer film had a tensile strength of 33.0 N/mm$^2$ and an electrical conductivity of 45 $\Omega^{-1}$ cm$^{-1}$.

EXAMPLE 8

The procedure described in Example 7 was followed, except that in this case the anode used was a p-conductive polyphenylene doped with 23% of AsF$_6^-$. After the pyrrole/thiophene monomer mixture had been polymerized onto the anode, the resulting film had a conductivity of 150 $\Omega^{-1}$ cm$^{-1}$.

EXAMPLE 9

120 ml of acetonitrile, 0.84 ml of water, 0.48 g of pyrrole, 0.05 g of acrylonitrile and 1.18 g of concentrated sulfuric acid were initially taken in a glass vessel, and the mixture was stirred. Electrolysis was otherwise carried out as described in Example 1, using a current of 100 amp.sec. The resulting 30 μm thick copolymer film had a tensile strength of 65 N/mm$^2$ and an electrical conductivity of 47 $\Omega^{-1}$ cm$^{-1}$.

EXAMPLE 10

120 ml of acetonitrile, 0.84 ml of water, 0.48 g of pyrrole, 0.15 g of diacetoneacrylamide and 1.15 g of K(AsF$_6$) were initially taken in a glass vessel, and the mixture was stirred. Electrolysis was carried out as described in Example 1, except that in this case a current of 100 amp.sec was used. The resulting 28 μm thick copolymer film had a tensile strength of 28 N/mm$^2$ and an electrical conductivity of 50 $\Omega^{-1}$ cm$^{-1}$.

EXAMPLE 11

The procedure described in Example 1 was followed, except that in this case 0.5 g of terfuran was added to each of the pyrrole/furan monomer mixtures. The results are summarized in Table 2. The film obtained in each case was flat and had a smooth surface.

TABLE 2

| Experiment | Monomer mixtures | | | Tensile strength N/mm$^2$ | Conductivity $\Omega^{-1}$ cm$^{-1}$ |
|---|---|---|---|---|---|
| | Pyrrole (parts) | Furan (parts) | Terfuran (parts) | | |
| 11 a | 0.4 | 0.08 | 0.5 | 85 | 86 |
| b | 0.38 | 0.1 | 0.5 | 83 | 82 |
| c | 0.30 | 0.18 | 0.5 | 92 | 95 |
| d | 0.24 | 0.24 | 0.5 | 84 | 150 |
| e | 0.20 | 0.28 | 0.5 | 92 | 140 |
| f | 0.10 | 0.38 | 0.5 | 90 | 105 |
| g | 0.01 | 0.47 | 0.5 | 85 | 110 |

EXAMPLE 12

The procedure described in Example 1 was followed, except that in this case 0.5 g of pyrrole, 0.2 g of hexathienyl and, as the conductive salt, 0.6 g of tributylammonium perchlorate were initially taken. The resulting 60 μm thick film had a tensile strength of 97 N/mm$^2$ and an electrical conductivity of 84 $\Omega^{-1}$ cm$^{-1}$, and was smooth and showed no bubbles at the surface.

EXAMPLE 13

120 ml of acetonitrile, 0.48 g of pyrrole and, as the conductive salt, 1.4 g of 2-nitrophenol and 1.85 g of tributylamine were initially taken in a glass vessel, and the mixture was stirred. Electrolysis was carried out as described in Example 1, 0.6 g of cyclooctatetrafuran being metered in at the same time. The resulting 65 μm thick copolymer film had a tensile strength of 50 N/mm$^2$ and an electrical conductivity of 45 $\Omega^{-1}$ cm$^{-1}$.

EXAMPLE 14

120 ml of acetonitrile, 0.48 g of pyrrole, 0.2 g of quaterfuran, 0.2 g of 3,5-dimethylpyrazine, 1.5 g of tributylammonium sulfate and 0.93 g of tributylamine were initially taken in a glass vessel, and the mixture was stirred. Electrolysis was carried out as described in Example 1. The resulting 55 μm thick copolymer film had a tensile strength of 65 N/mm$^2$ and an electrical conductivity of 80 $\Omega^{-1}$ cm$^{-1}$.

EXAMPLE 15

The procedure described in Example 1 was followed, except that in this case 120 ml of acetonitrile, 0.6 g of bifuran, 0.36 g of 3,4-dimethylpyrrole and 0.49 g of tributylammonium perchlorate were initially taken under argon. The anode used in this case was a polypyrrole film, and electrolysis was carried out using a current of 80 amp.sec. The resulting 65 μm thick film had a tensile strength of 105 N/mm$^2$ and an electrical conductivity of 74 $\Omega^{-1}$ cm$^{-1}$.

EXAMPLE 16

120 ml of acetonitrile, 0.61 g of 3,4-dimethylpyrrole, 0.6 g of bisthiophene and 0.45 g of tributylammonium hexafluorophosphate were initially taken in a glass vessel, and the mixture was stirred. The anode used was a p-conductive polyacetylene film doped with 10% of PF$_6^-$, and the procedure described in Example 1 was followed. The resulting 55 μm thick film had a tensile strength of 45 N/mm$^2$ and an electrical conductivity of 50 $\Omega^{-1}$ cm$^{-1}$.

EXAMPLE 17

120 ml of acetonitrile, 0.84 ml of water, 0.20 g of pyrrole, 0.28 g of quater(N-methylpyrrole), 0.08 g of thiophene and 0.8 g of tetramethylammonium tetrafluoroborate were initially taken in a glass vessel, and the mixture was stirred. The anode used in this case was a p-conductive polyacetylene film doped with 23% of AsF$_6^-$, and electrolysis was carried out using a current of 100 amp.sec, the procedure otherwise being as described in Example 1. The resulting 55 μm thick copolymer film had a tensile strength of 56 N/mm$^2$ and an electrical conductivity of 180 $\Omega^{-1}$ cm$^{-1}$.

We claim:

1. An electrically conductive copolymer which comprises from 20 to 90% by weight of pyrrole units derived from a monomer or mixture of monomers selected from the group consisting of unsubstituted pyrrole, N-alkylpyrrole, N-arylpyrrole, and monoalkyl-, dialkyl-, monohalo-, and dihalo-pyrroles wherein substitution is at the carbon atoms, and from 80 to 10% by weight of other heterocyclic units derived from a comonomer or mixture of comonomers consisting of a substituted or unsubstituted heterocyclic compound characterized by a 5- or 6-membered ring and a conjugated π-electron system.

2. The copolymer of claim 1, wherein the heterocyclic compounds are furan, thiophene, thiazole, thiadiazole, oxazole, imidazole, pyridine, pyrimidine, pyrazine and/or alkyl-substituted derivatives of these.

3. The copolymer of claim 1, wherein the copolymer is formed from pyrrole and furan.

4. The copolymer of claim 1, wherein the copolymer is formed from pyrrole and thiophene.

5. The copolymer of claim 1, wherein the copolymer is formed from pyrrole and hexathienyl.

6. The copolymer of claim 1, wherein the copolymer is formed from 3,4-dimethylpyrrole and thiophene.

* * * * *